US010220826B2

(12) United States Patent
Saito et al.

(10) Patent No.: US 10,220,826 B2
(45) Date of Patent: Mar. 5, 2019

(54) DRIVE CONTROL APPARATUS

(71) Applicant: DENSO CORPORATION, Kariya, Aichi-pref. (JP)

(72) Inventors: Tomohiro Saito, Kariya (JP); Hiroshi Okada, Kariya (JP); Yukihiro Jo, Kariya (JP); Kazutoshi Nishinakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 294 days.

(21) Appl. No.: 15/196,451

(22) Filed: Jun. 29, 2016

(65) Prior Publication Data

US 2016/0375890 A1 Dec. 29, 2016

(30) Foreign Application Priority Data

Jun. 29, 2015 (JP) ................ 2015-129763

(51) Int. Cl.
*B60K 6/48* (2007.10)
*B60W 20/10* (2016.01)
(Continued)

(52) U.S. Cl.
CPC ............... *B60W 20/10* (2013.01); *B60K 6/36* (2013.01); *B60K 6/387* (2013.01); *B60K 6/48* (2013.01); *B60K 6/547* (2013.01); *B60W 10/06* (2013.01); *B60W 10/08* (2013.01); *B60W 10/11* (2013.01); *B60W 20/15* (2016.01); *B60W 20/30* (2013.01); *B60W 30/19* (2013.01); *B60K 2006/4808* (2013.01); *B60K 2006/4825* (2013.01); *B60W 2510/081* (2013.01); *B60W 2510/1005* (2013.01); *B60W 2520/10* (2013.01); *B60W 2520/105* (2013.01); *B60W 2710/021* (2013.01); *B60W 2710/0644* (2013.01); *B60W 2710/081* (2013.01); *B60W 2710/083* (2013.01);
(Continued)

(58) Field of Classification Search
CPC .... B60K 2006/4808; B60K 2006/4825; B60K 6/547; B60W 10/08; B60W 10/11
See application file for complete search history.

(56) References Cited

U.S. PATENT DOCUMENTS

| 8,140,205 B2* | 3/2012 | Hanyu ..................... B60K 6/48 701/22 |
| 2011/0098151 A1 | 4/2011 | Ziemer |
| 2014/0221156 A1 | 8/2014 | Sugimura et al. |

FOREIGN PATENT DOCUMENTS

| JP | 2013-129212 A | 7/2013 |
| JP | 2014-084084 A | 5/2014 |

* cited by examiner

*Primary Examiner* — Tisha D Lewis
(74) *Attorney, Agent, or Firm* — Oliff PLC

(57) ABSTRACT

A drive control apparatus includes a motor control unit and a gear shift control unit, and controls a power transmission system including first and second motors and a gear shift mechanism. When the gear shift mechanism is changed from a first gear stage to a second gear stage during deceleration of the vehicle, the motor control unit controls the first motor to be at a target rotation speed determined based on a gear ratio of a second power transmission gear and a rotation speed of an output shaft, and controls a second motor such that required brake torque is generated by the second motor. The gear shift control unit controls the gear shift mechanism so as to be in a neutral state in which power is not transmitted between an input shaft and the output shaft, until a rotation speed of the first motor becomes the target rotation speed.

10 Claims, 10 Drawing Sheets

(51) Int. Cl.
  *B60W 10/11*    (2012.01)
  *B60W 10/06*    (2006.01)
  *B60W 10/08*    (2006.01)
  *B60W 20/30*    (2016.01)
  *B60K 6/387*    (2007.10)
  *B60K 6/36*     (2007.10)
  *B60K 6/547*    (2007.10)
  *B60W 30/19*    (2012.01)
  *B60W 20/15*    (2016.01)

(52) U.S. Cl.
  CPC .. *B60W 2710/1005* (2013.01); *B60Y 2200/92* (2013.01); *B60Y 2300/43* (2013.01); *B60Y 2300/60* (2013.01); *B60Y 2300/70* (2013.01); *B60Y 2400/42* (2013.01); *B60Y 2400/70* (2013.01); *Y02T 10/626* (2013.01); *Y02T 10/6221* (2013.01); *Y02T 10/6252* (2013.01); *Y02T 10/6286* (2013.01); *Y10S 903/914* (2013.01); *Y10S 903/919* (2013.01); *Y10S 903/93* (2013.01)

| m   | 0 | 1 | 2 |
|-----|---|---|---|
| me1 | 0 | 1 | 0 |
| me2 | 0 | 0 | 1 |

DRIVE CONTROL APPARATUS

CROSS-REFERENCE TO RELATED APPLICATION

This application is based on and claims the benefit of priority from Japanese Patent Application No. 2015-129763, filed Jun. 29, 2015. The entire disclosure of the above application is incorporated herein by reference.

BACKGROUND

Technical Field

The present disclosure relates to a drive control apparatus.

Related Art

Conventionally, a control apparatus for a hybrid vehicle including a dual-clutch transmission is known. For example, in JP-A-2014-84084, when a gear shift stage (also called a gear stage or a shift stage) of a transmission is shifted towards the deceleration side using odd-numbered gear shift stages, the occurrence of gear shift shock is suppressed by torque corresponding to an intermediate even-numbered gear stage being set.

In JP-A-2014-84084, gear shift shock attributed to torque variation is alleviated. However, a phenomenon in which torque is temporarily interrupted in accompaniment with the shifting of the gear shift stage cannot be prevented.

SUMMARY

It is thus desired to provide a drive control apparatus that enables a gear shift stage to be shifted without torque being interrupted.

An exemplary embodiment of the present disclosure provides a drive control apparatus of the present disclosure that controls a power transmission system. The power transmission system includes an engine, a first motor, a second motor, a power transmission mechanism, and a gear shift mechanism. The engine is connected to one side of an input shaft. The motor is connected to the other side of the input shaft. The second motor is connected to an output shaft that is connected to an axle of a vehicle.

The power transmission mechanism has a plurality of power transmission gears. The power transmission gear includes an input shaft-side gear that is provided on the input shaft and an output shaft-side gear that is provided on the output shaft. The power transmission gear is provided so as to be capable of transmitting power between the input shaft and the output shaft, via the input shaft-side gear and the output shaft-side gear.

The gear shift mechanism changes the power transmission gear used to transmit power between the input shaft and the output shaft.

The drive control apparatus includes a motor control unit and a gear shift control unit. The motor control unit controls the first motor and the second motor. The gear shift control unit controls the gear shift mechanism.

Here, of the two power transmission gears, a gear having a relatively small gear ratio is a first power transmission gear. A gear having a relatively large gear ratio is a second power transmission gear. In addition, a state in which power is transmitted between the input shaft and the output shaft by the first power transmission gear is a first gear shift stage. A state in which power is transmitted by the second power transmission gear is a second gear shift stage.

When shifting from the first gear shift stage to the second gear shift stage is performed during deceleration of a vehicle, the motor control unit controls the first motor to be at a target rotation speed determined based on the gear ratio of the second power transmission gear and a rotation speed of the output shaft. The motor control unit also controls the second motor such that required brake torque is generated by the second motor. In addition, the gear shift control unit controls the gear shift mechanism so as to be in a neutral state in which power is not transmitted between the input shaft and the output shaft, until the rotation speed of the first motor becomes the target rotation speed.

In the exemplary embodiment, when the gear shift stage is shifted during vehicle deceleration, the second motor takes on the generation of the brake torque required for deceleration. Therefore, interruption of the brake torque does not occur at any time during gear shifting. In addition, the gear shift mechanism is in the neutral state until the rotation speed of the first motor becomes the target rotation speed. The gear shift stage is shifted after the rotation speed of the first motor becomes the target rotation speed. As a result, the rotations of the input shaft and the output shaft are promptly synchronized. Consequently, gear shift shock can be reduced.

DESCRIPTION OF THE EMBODIMENTS

A drive control apparatus of the present disclosure will hereinafter be described with reference to the drawings. Configurations that are substantially identical among the plurality of embodiments described hereafter are given the same reference numbers. Descriptions thereof are omitted.

First Embodiment

A drive control apparatus according to a first embodiment of the present disclosure will be described with reference to FIG. 1 to FIG. 5.

Figure 1:
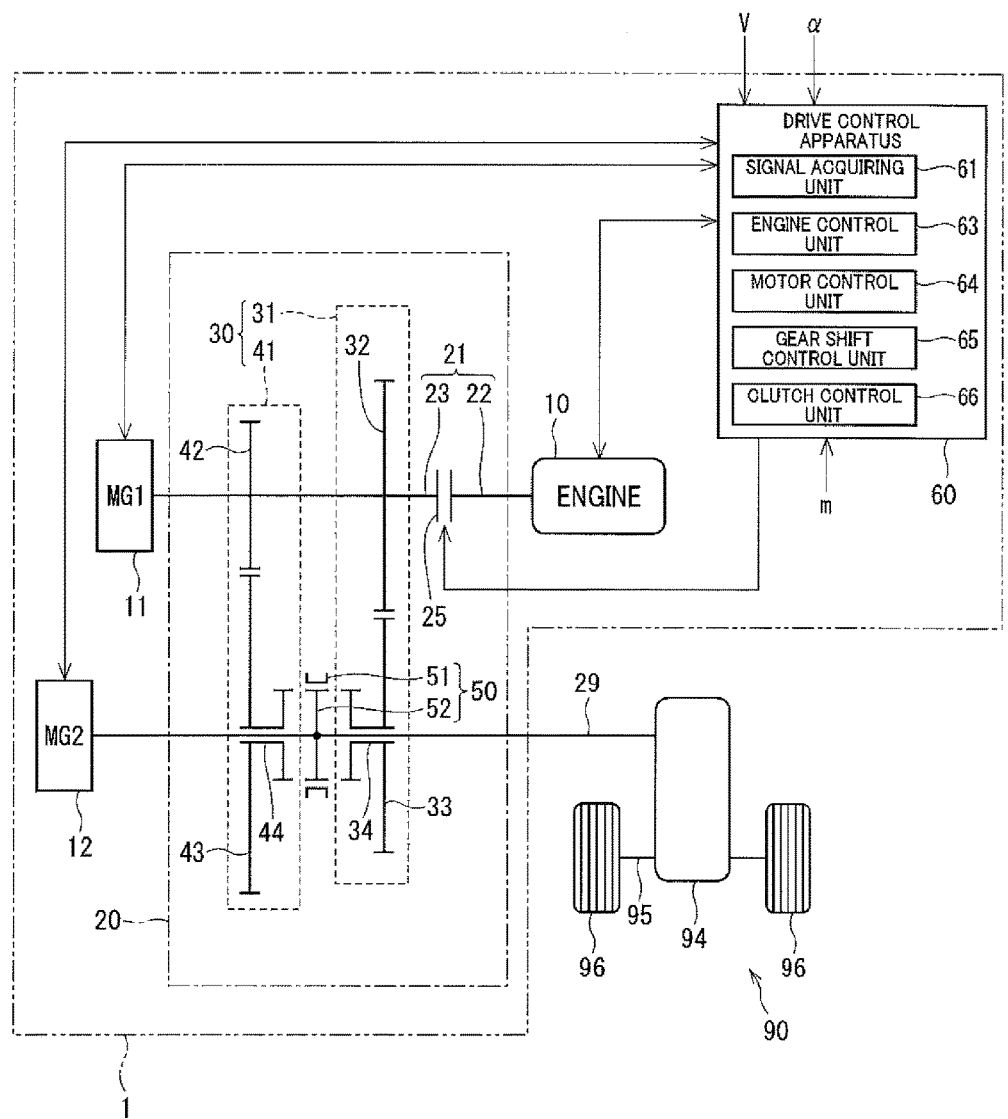
FIG. 1 is an overall configuration diagram of a power transmission system according to a first embodiment of the present disclosure.

As shown in FIG. 1, a power transmission system 1 includes an engine 10, a first motor 11, a second motor 12, a power transmission apparatus 20, a drive control apparatus 60, and the like. The power transmission system 1 is applied to a vehicle 90 that is a hybrid vehicle. The vehicle 90 uses power from the engine 10, the first motor 11, and the second motor 12 as a drive source.

The engine 10 is an internal combustion engine that uses gasoline, for example, as fuel.

The first motor 11 and the second motor 12 are electric motors that are rotated by electric power supplied from a battery (not shown) that is mounted in the vehicle 90. In addition, the first motor 11 and the second motor 12 each generate power by torque being inputted to a motor shaft and thereby function as a generator capable of charging a battery. That is, the first motor 11 and the second motor 12 are so-called "motor generators". However, in the present specification, the first motor 11 and the second motor 12 will simply be referred to as "motors". In addition, in the drawings, the first motor 11 is denoted "MG1", and the second motor 12 is denoted "MG2".

According to the present embodiment, the number of rotations of the first motor 11 is a number of rotations N1. The number of rotations of the second motor 12 is a second number of rotations N2. According to the present embodiment, the number of rotations per unit time that is expressed, for example, by the unit [rpm] corresponds to "rotation speed".

The power transmission apparatus 20 includes an input shaft 21, input shaft clutch 25 that serves as a connecting/disconnecting portion, an output shaft 29, a power transmission mechanism 30, a gear shift mechanism 50, and the like.

The input shaft 21 has an engine input shaft 22 and a motor input shaft 23.

One end of the engine input shaft 22 is connected to a crank shaft of the engine 10, and the other end is provided such as to oppose the motor input shaft 23. The engine input shaft 22 is provided with a torsion damper (not shown).

The motor input shaft 23 is provided coaxially with the engine input shaft 22. One end of the motor input shaft 23 is connected to a motor shaft of the first motor 11. Power generated by the first motor 11 is transmitted to the motor input shaft 23. The other end of the motor input shaft 23 is provided such as to oppose the engine input shaft 22.

The input shaft clutch 25 serves to connect and disconnect the engine 10 and the first motor 11. The input shaft clutch 25 is provided between the engine input shaft 22 and the motor input shaft 23. When the input shaft clutch 25 is engaged, the engine input shaft 22 and the motor input shaft 23 integrally rotate, and power is transmitted. In addition, when the input shaft clutch 25 is released, the power is not transmitted via the engine input shaft 22 and the motor input shaft 23.

The output shaft 29 is provided in parallel with the input shaft 21. One end of the output shaft 29 is connected to a motor shaft of the second motor 12. The output shaft 29 rotates integrally with the second motor 12. That is, the number of rotations of the output shaft 29 matches the second number of rotations N2. The power generated by the second motor 12 is transmitted to the output shaft 29. The other end of the output shaft 29 is connected to an axle 95, with a differential gear 94 therebetween. Drive wheels 96 provided on both ends of the axle 95 are driven by power transmitted through the power transmission apparatus 20.

The power transmission mechanism 30 has a first power transmission gear 31 and a second power transmission gear 41.

The first power transmission gear 31 has a first drive gear 32 and a first driven gear 33.

The first drive gear 32 is fixed to the motor input shaft 23 in a coaxial manner and such as to be incapable of relative rotation. The first driven gear 33 meshes with the first drive gear 32 and is provided such as to be capable of relative rotation to the output shaft 29. The first driven gear 33 is provided with a first engaging portion 34. The first engaging portion 34 is formed such as to be capable of engaging with a sleeve 51 of the gear shift mechanism 50, described hereafter.

The number of teeth of the first drive gear 32 is Nt32, and the number of teeth of the first driven gear 33 is Nt33. In this case, a first gear ratio ρ1, which is a gear ratio of the first power transmission gear 31, is expressed by the following expression (1).

$$\rho 1 = Nt33/Nt32 \qquad (1)$$

That is, the first gear ratio ρ1 can be said to be the number of teeth of the first driven gear 33 with respect to the number of teeth of the first drive gear 32.

The second power transmission gear 41 has a second drive gear 42 and a second driven gear 43.

The second drive gear 42 is fixed to the motor input shaft 23 in a coaxial manlier and such as to be incapable of relative rotation. The second driven gear 43 meshes with the second drive gear 42 and is provided such as to be capable of relative rotation to the output shaft 29. The second driven gear 43 is provided with a second engaging portion 44. The second engaging portion 44 is formed such as to be capable of engaging with the sleeve 51.

The number of teeth of the second drive gear 42 is Nt42, and the number of teeth of the second driven gear 43 is Nt43. In this case, a second gear ratio ρ2, which is a gear ratio of the second power transmission gear 41, is expressed by the following expression (2).

$$\rho 2 = Nt43/Nt42 \qquad (2)$$

That is, the second gear ratio ρ2 can be said to be the number of teeth of the second driven gear 43 with respect to the number of teeth of the second drive gear 42.

According to the present embodiment, the first power transmission gear 31 is provided on the engine 10 side. The second power transmission gear 41 is provided on the first motor 11 side. In addition, the second gear ratio ρ2 is greater than the first gear ratio ρ1. That is, ρ1<ρ2.

The gear shift mechanism 50 is a publicly known synchromesh type that has, in addition to the sleeve 51 and a neutral engaging portion 52, a synchronizing ring and the like (not shown).

The sleeve 51 is provided such as to be capable of engaging with any of the engaging portions 34, 44, and 52. As a result of the sleeve 51 engaging with the first engaging portion 34, the first driven gear 33 and the output shaft 29 integrally rotate. As a result, power transmission becomes possible between the input shaft 21 and the output shaft 29, via the first power transmission gear 31.

In addition, as a result of the sleeve 51 engaging with the second engaging portion 44, the second driven gear 43 and the output shaft 29 integrally rotate. As a result, power transmission becomes possible between the input shaft 21 and the output shaft 29 via the second power transmission gear 41.

The neutral engaging unit 52 is fixed to the output shaft 29 in a coaxial manner and such as to be incapable of relative rotation. When the sleeve 51 engages with the neutral engaging portion 52, the first power transmission gear 31 and the second power transmission gear 41 are not connected to the output shaft 29. Power is not transmitted between the input shaft 21 and the output shaft 29.

According to the present embodiment, the state in which the sleeve 51 is engaged with the first engaging portion 34 is referred to as a "first gear shift stage (also called a first gear stage or a first shift stage)". The state in which the sleeve 51 is engaged with the second engaging portion 44 is referred to as a "second gear shift stage (also called a second gear stage or a second shift stage)". The state in which the sleeve 51 is engaged with the neutral engaging portion 52 is referred to as a "neutral state".

According to the present embodiment, a gear shift stage m is shifted by the single gear shift mechanism 50. Therefore, compared to when a plurality of gear shift mechanisms are provided, as in JP-A-2014-84084, for example, size reduction of the apparatus becomes possible.

The drive control apparatus 60 controls the power transmission system 1. The drive control apparatus 60 is mainly configured by a microcomputer that includes a central processing unit (CPU), a read-only memory (ROM), a random access memory (RAM), and the like. Processes performed by the drive control apparatus 60 may be software processes actualized by the CPU running a program stored in advance or hardware processes actualized by a dedicated electronic circuit.

As a functional block, the drive control apparatus 60 has a signal acquiring unit 61, an engine control unit 63, a motor control unit 64, a gear shift control unit 65, and a clutch control unit 66. The clutch control unit 66 serves as a connection-disconnection control unit.

The signal acquiring unit 61 acquires an accelerator position α, a vehicle speed V that is the travelling speed of the vehicle 90, the first number of rotations N1, the second number of rotations N2, the gear shift stage m of the gear shift mechanism 50, and the like. The gear shift stage m is set such that m=0 indicates the neutral state, m=1 indicates the first gear shift stage, and m=2 indicates the second gear shift stage, depending on the position of the sleeve 51. This similarly applies to a target gear shift stage m_tgt, described hereafter.

The acquired signals are used in various calculations performed by the drive control apparatus 60.

The engine control unit 63 controls driving of the engine 10.

The motor control unit 64 controls driving of the first motor 11 and the second motor 12.

The gear shift control unit 65 controls the gear shift stage m of the gear shift mechanism 50. According to the present embodiment, the gear shift stage m is controlled by a gear shift stage controlled variable M_sft being controlled. The gear shift stage controlled variable M_sft is a controlled variable of the sleeve 51.

The clutch control unit 66 controls connection and disconnection of the input shaft clutch 25.

To avoid confusion, control lines in FIG. 1 are omitted as appropriate. This similarly applies to FIG. 8, described hereafter.

According to the present embodiment, when the vehicle 90 is decelerated, brake torque is generated by regenerative driving of the first motor 11 or the second motor 12 being performed. Here, when a single motor is provided, torque may become insufficient during re-acceleration or sudden deceleration. In addition, brake torque may be interrupted for an instant when the gear shift stage m is shifted.

According to the present embodiment, when the gear shift mechanism 50 is in the neutral state, the second motor 12 that is directly connected to the output shaft 29 takes on the generation of brake torque required for deceleration. As a result, the gear shift stage m can be shifted without the brake torque being interrupted.

A gear shift process according to the present embodiment will be described with reference to the flowchart shown in FIG. 2. The present process is performed by the drive control apparatus 60 when the vehicle 90 is travelling in electric vehicle (EV) mode. EV mode is when the engine 10 is stopped, and the vehicle 90 is travelling by the driving force from at least either of the first motor 11 and the second motor 12. This similarly applies to a gear change process according to a second embodiment.

At the first step S101, the signal acquiring unit 61 reads various signals. Specifically, the signal acquiring unit 61 reads the accelerator position α, the vehicle speed V, the first number of rotations N1, the second number of rotations N2, and the gear shift stage m.

Hereafter, "step" of step S101 will be omitted and simply expressed by the symbol "S". This similarly applies to other steps.

Figure 3A:
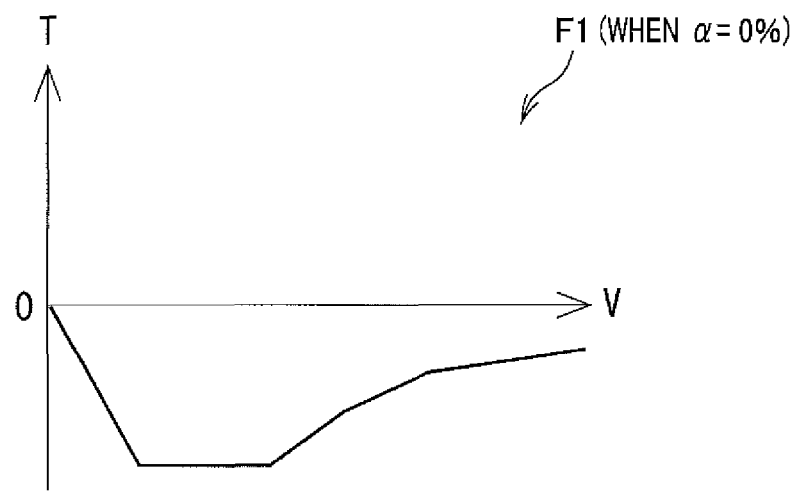
FIG. 3A and FIG. 3B are explanatory diagrams for explaining a map used to calculate a required torque according to the first embodiment of the present disclosure.
Figure 3B:
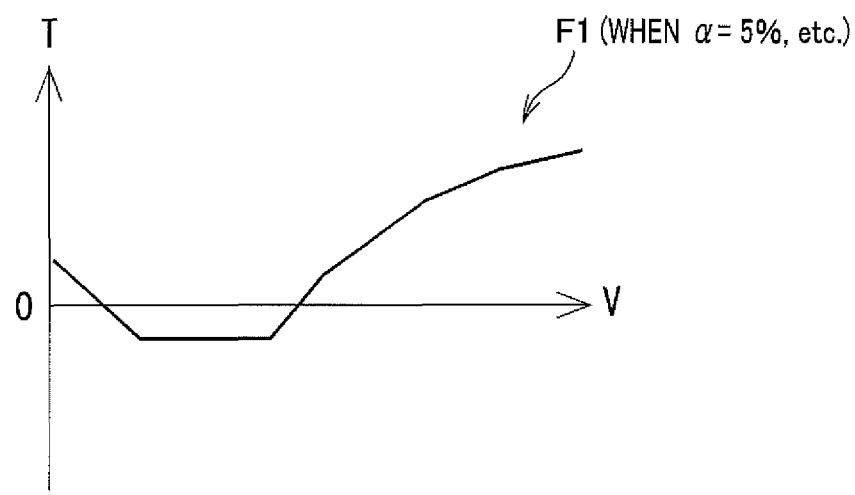

At S102, the motor control unit 64 calculates a required torque T. The motor control unit 64 calculates the required torque T using a map F1 shown in FIGS. 3A and 3B, based on the accelerator position α and the vehicle speed V. FIG. 3A shows a map used when the accelerator position α=0. FIG. 3B shows a map used when the accelerator position α is a predetermined value (such as 5%). According to the present embodiment, a plurality of maps based on the accelerator position α are stored in a storage unit (not shown).

When the required torque T is a positive value, drive torque is generated by power running of the first motor 11 or the second motor 12. When the required torque T is a negative value, brake torque is generated by regeneration of the first motor 11 or the second motor 12.

"Fn(z)" in the flowchart indicates that calculation is performed using a map or a function Fn and a parameter that is z.

At S103, the motor control unit 64 determines whether or not the required torque T is less than 0. When determined that the required torque T is 0 or more (NO at S103), the drive control apparatus 60 does not perform the processes at S104 and subsequent steps. When determined that the required torque T is less than 0 (YES at S103), the drive control apparatus 60 proceeds to S104.

At S104, the gear shift control unit 65 calculates the target gear shift stage mtgt. The gear shift control unit 65 calculates the target gear shift stage mtgt based on the required torque T and the vehicle speed V, using a map F2 shown in FIG. 4. According to the present embodiment, a plurality of maps based on the required torque T (more specifically, the brake torque) are stored in the storage unit (not shown).

Figure 4:
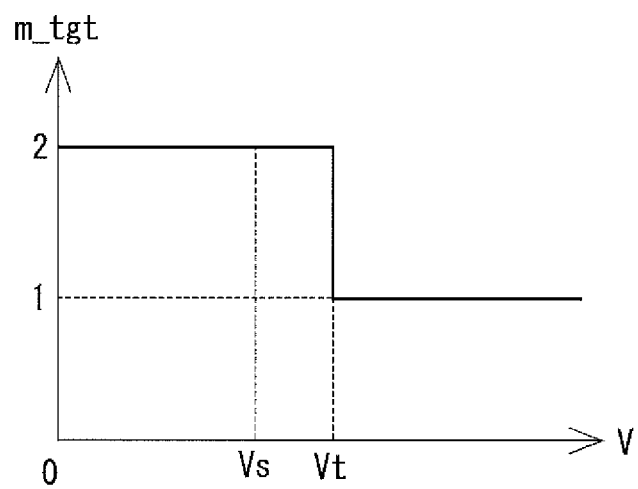
FIG. 4 is an explanatory diagram for explaining a map used to calculate a target gear shift stage according to the first embodiment of the present disclosure.
Figure 5:
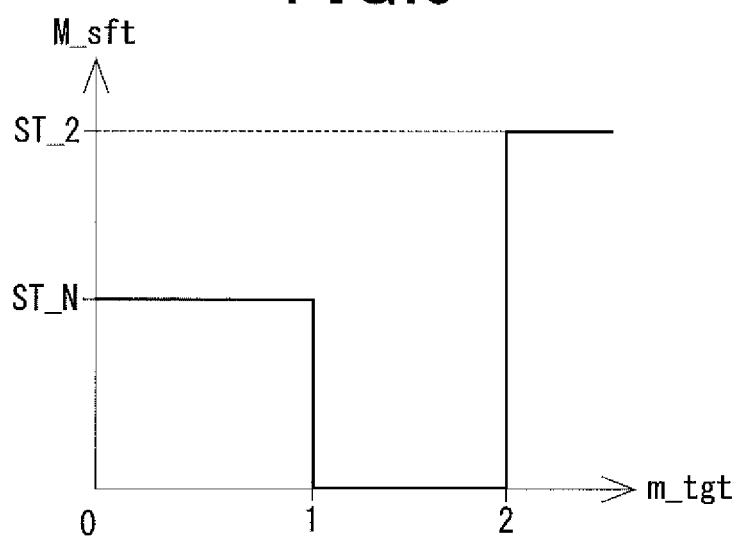
FIG. 5 is an explanatory diagram for explaining a map used to calculate a gear shift stage controlled variable according to the first embodiment of the present disclosure.

As shown in FIG. 4, when the vehicle speed V is higher than a target gear shift range shifting value Vt, the target gear shift stage m_tgt is set to 1. In addition, when the vehicle speed V is the target gear shift range shifting value Vt or lower, the target gear shift stage m_tgt is set to 2.

At S105, the motor control unit 64 calculates a target number of rotations N1_tgt of the first motor 11. The target number of rotations N1_tgt is the number of rotations at which the rotations of the first input shaft 21 and the output shaft 29 become synchronized, when the gear shift stage m is set to the target gear shift stage m_tgt. The target number of rotations N1_tgt is expressed by the following expression (3).

$$N1\_tgt = \rho(m\_tgt) \times N2 \quad (3)$$

In the above expression (3), ρ(m_tgt) indicates the gear shift ratio when the gear shift stage m is set to the target gear shift stage m_tgt. When the target gear shift stage m_tgt is 1, ρ(m_tgt)=ρ1. When the target gear shift stage m_tgt is 2, ρ(m_tgt)=ρ2.

According to the present embodiment, the second motor 12 and the output shaft 29 integrally rotate. Therefore, the second number of rotations N2 can be considered to be the "rotation speed of the output shaft".

At S106, the gear shift control unit 65 determines whether or not the current gear shift stage m is the target gear shift stage m_tgt. When determined that the current gear shift stage m is the target gear shift stage m_tgt (YES at S106), the drive control apparatus 60 proceeds to S111. When determined that the current gear shift stage m is not the target gear shift stage m_tgt (NO at S106), the drive control apparatus 60 proceeds to S107.

At S107, the motor control unit 64 determines whether or not the first number of rotations N1 matches the target number of rotations N1_tgt. The first number of rotations N1 is the number of rotations of the first motor 11. Here, when the first number of rotations N1 is within a predetermined range including the target number of rotations N1_tgt, the first number of rotations N1 is considered to match the target number of rotations N1_tgt. When determined that the first number of rotations N1 does not match the target number of rotations N1_tgt (NO at S107), the drive control apparatus 60 proceeds to S109. When determined that the first number of rotations N1 matches the target number of rotations N1_tgt (YES at S107), the drive control apparatus 60 proceeds to S108.

At S108, the gear shift control unit 65 determines whether or not the vehicle speed V is lower than a gear shift stage shift allowable value Vs. As shown in FIG. 4, the gear shift stage shift allowable value Vs is smaller than the target gear shift stage shifting value Vt. When determined that the vehicle speed V is lower than the gear shift stage shift allowable value Vs (YES at S108), the drive control apparatus 60 proceeds to S111. When determined that the vehicle speed V is the gear shift stage shift allowable value Vs or higher (NO at S108), the drive control apparatus 60 proceeds to S109.

When determined that the first number of rotations N1 does not match the target number of rotations N1_tgt (NO at S107), or when determined that the vehicle speed V is the gear shift stage shift allowable value Vs or higher (NO at S108), the drive control apparatus 60 proceeds to S109. At S109, the gear shift control unit 65 sets the target gear shift stage m_tgt to 0, or in other words, to the neutral state.

At S110, the motor control unit 64 calculates a first torque command value T1* and a second torque command value T2*. The first torque command value T1* is a torque command value of the first motor 11. The second torque command value T2* is a torque command value of the second motor 12. The motor control unit 64 calculates the first torque command value T1* by Proportional-Integral-Derivative (PID) calculation or the like, based on the difference between the target number of rotations N1_tgt and the first number of rotations N1, such that the target number of rotations N1_tgt and the first number of rotations N1 match. In addition, the second torque command value T2* is set to the required torque T (refer to the following expression (5)).

When determined that the current gear shift stage m is the target gear shift stage m_tgt (YES at S106), or when determined that the first number of rotations N1 matches the target number of rotations N1_tgt and the vehicle speed V is lower than the gear shift stage shift allowable value Vs (YES at S107 and YES at S108), the drive control apparatus 60 proceeds to S111. At S111, the motor control unit 64 calculates the first torque command value T1* and the second torque command value T2*. Here, the first torque command value T1* is 0 and the second torque command value T2* is the required torque T (refer to the following expressions (4) and (5)).

$$T1^* = 0 \quad (4)$$

$$T2^* = T \quad (5)$$

After S110 or S111, the drive control unit 60 proceeds to S112. At S112, the gear shift control unit 65 calculate the gear shift stage controlled variable M_sft. The gear shift stage controlled variable M_sft indicates an amount of movement from a reference position. The reference position is a position when the sleeve 51 is engaged with the first engaging portion 34 (that is, M_sft=0). The gear shift control unit 65 calculates the gear shift stage controlled variable M_sft based on the target gear shift stage m_tgt, using a map F3 shown in FIG. 5. When the target gear shift stage m_tgt is 0, the gear shift control unit 65 sets the gear shift stage controlled variable M_sft to a controlled variable ST_N that is based on the distance between the first engaging portion 34 and the neutral engaging portion 52. When the target gear shift stage m_tgt is 1, the gear shift control unit 65 sets the gear shift stage controlled variable M_sft to 0. When the target gear shift stage m_tgt is 2, the gear shift control unit 65 sets the gear shift stage controlled variable M_sft to a controlled variable ST_2 that is based on the distance between the first engaging portion 34 and the second engaging portion 44. When the gear shift stage does not change, the controlled variable based on the target gear shift stage m_tgt is maintained.

According to the present embodiment, the motor shaft of the second motor 12 and the output shaft 29 are directly connected. Therefore, even when the gear shift stage m of the gear shift mechanism 50 is in the neutral state, the second motor 12 can generate the brake torque. Consequently, a phenomenon in which the brake torque is interrupted in accompaniment with the shifting of the gear shift stage m does not occur.

In addition, the motor control unit 64 sets the target number of rotations N1_tgt such that the numbers of rotation of the input shaft 21 and the output shaft 29 become synchronized after the shifting of the gear shift stage m. The motor control unit 64 controls the first motor 11 such that the first number of rotations N1 is the target number of rotations N1_tgt.

When the first number of rotations N1 does not match the target number of rotations N1_tgt, the gear shift control unit 65 maintains the neutral state. When the first number of rotations N1 matches the target number of rotations N1_tgt, the gear shift control unit 65 shifts the gear shift stage m. As a result, when the gear shift stage m is shifted, the rotations of the input shaft 21 and the output shaft 29 are promptly synchronized. Therefore, gear shift shock accompanying the shifting of the gear shift range m is reduced.

In addition, even should shifting to a gear shift stage having a large gear ratio be required as a result of sudden braking or the like in a state in which the vehicle speed V is high, insufficiency in brake torque attributed to motor inertia can be reduced.

According to the present embodiment, the gear shift stage shift allowable value Vs at which the gear shift stage is actually shifted is set to be smaller than the target gear shift stage shifting value Vt at which the target gear shift stage m_tgt is changed. As a result, the number of rotations of the first motor 11 can be controlled to the number of rotations based on the state after the gear shift stage is shifted, before the actual shifting of the gear shift stage. In addition, when the vehicle speed V is between the gear shift stage shift allowable value Vs and the target gear shift stage shifting value Vt, the gear shift stage m is kept in the neutral state. Therefore, frequent shifting of the gear shift stage m when the vehicle speed V varies, such as during re-acceleration, can be prevented.

As described in detail above, the drive control apparatus 60 according to the present embodiment controls the power transmission system 1.

The power transmission system 1 includes the engine 10, the first motor 11, the second motor 12, the power transmission mechanism 30, and the gear shift mechanism 50.

The engine 10 is connected to one side of the input shaft 21. The first motor 11 is connected to the other side of the input shaft 21. The second motor 12 is connected to the output shaft 29 that is connected to the axle 95.

The power transmission mechanism 30 has a plurality of power transmission gears 31 and 41.

The first power transmission gear 31 includes the first drive gear 32 and the first driven gear 33. The first drive gear 32 is provided on the input shaft 21. The first driven gear 33 is provided on the output shaft 29. The first power transmission gear 31 is provided such that the input shaft 21 and the output shaft 29 are capable of power transmission via the first drive gear 32 and the first driven gear 33.

The second power transmission gear 41 has the second drive gear 42 and the second driven gear 43. The second drive gear 42 is provided on the input shaft 21. The second driven gear 43 is provided on the output shaft 29. The second power transmission gear 41 is provided such that the input shaft 21 and the output shaft 29 are capable of power transmission via the second drive gear 42 and the second driven gear 43.

The gear shift mechanism 50 switches between the power transmission gears 31 and 41 used for power transmission between the input shaft 21 and the output shaft 29.

The drive control apparatus 60 includes the motor control unit 64 and the gear shift control unit 65. The motor control unit 64 controls the first motor 11 and the second motor 12. The gear shift control unit 65 controls the gear shift mechanism 50.

Of the two power transmission gears 31 and 41, the gear having a relatively small gear ratio is the first power transmission gear 31. The gear having a relatively large gear ratio is the second power transmission gear 41. In addition, in the input shaft 21 and the output shaft 29, the state in which power is transmitted through the first power transmission gear 31 is referred to as the first gear shift stage. The state in which power is transmitted through the second power transmission gear 41 is referred to as the second gear shift stage.

When shifting from the first gear shift stage to the second gear shift stage is performed during deceleration of the vehicle 90, the motor control unit 64 controls the first motor 11 such as to achieve the target number of rotations N1_tgt based on the gear ratio of the second power transmission gear 41 and the second number of rotations N2. In addition, the motor control unit 64 controls the second motor 12 such that the required brake torque is generated by the second motor 12.

Furthermore, until the first number of rotation N1 becomes the target number of rotations N1_tgt, the gear shift control unit 65 controls the gear shift mechanism 50 so as to be in the neutral state in which power is not transmitted between the input shaft 21 and the output shaft 29 by the power transmission mechanism 30.

According to the present embodiment, when the gear shift stage m is shifted during vehicle deceleration, the second motor 12 that is directly connected to the output shaft 29 takes on the generation of the brake torque required for deceleration. Therefore, interruption of the brake torque does not occur at any time during gear shifting. In addition, the gear shift mechanism 50 is in the neutral state until the first number of rotations N1 becomes the target number of rotations N1_tgt. The gear shift stage m is shifted after the first number of rotations N1 becomes the target number of rotations N1_tgt. As a result, the rotations of the input shaft 21 and the output shaft 29 are promptly synchronized. Consequently, gear shift shock can be reduced. A smooth riding experience can be actualized. In addition, a highly responsive torque output becomes possible during re-acceleration.

In particular, when gear shifting to a gear shift stage having a large gear ratio is required as a result of sudden braking in a state in which the vehicle speed V is high, for example, the first motor 11 itself performs correction amounting to motor inertia. Therefore, insufficiency in brake torque can be reduced.

When the first number of rotations N1 is the target number of rotations N1_tgt and the vehicle speed V, which is the travelling speed of the vehicle 90, is lower than the gear shift stage shift allowable value Vs, which is a determination threshold, the gear shift control unit 65 controls the gear shift mechanism 50 so as to shift from the neutral state to the second gear shift stage.

When the vehicle speed V is the gear shift stage shift allowable value Vs or higher, the neutral state is maintained. As a result, frequent shifting of the gear shift state m accompanying variations in vehicle speed V can be prevented.

According to the present embodiment, the first number of rotations N1 corresponds to a "rotation speed of the first motor". The second number of rotations N2 corresponds to a "rotation speed of the output shaft". The target number of rotations N_tgt corresponds to a "target rotation speed". In addition, the drive gears 32 and 42 correspond to an "input shaft-side gear". The driven gears 33 and 43 correspond to an "output shaft-side gear".

Second Embodiment

A second embodiment of the present disclosure will be described with reference to FIG. 6.

According to the second embodiment and a third embodiment, the gear shift process differs from that according to the above-described embodiment. Configurations of the power transmission system 1 and the like are similar to those according to the above-described embodiment.

The gear shift process according to the present embodiment will be described with reference to the flowchart in FIG. 6.

Figure 2:
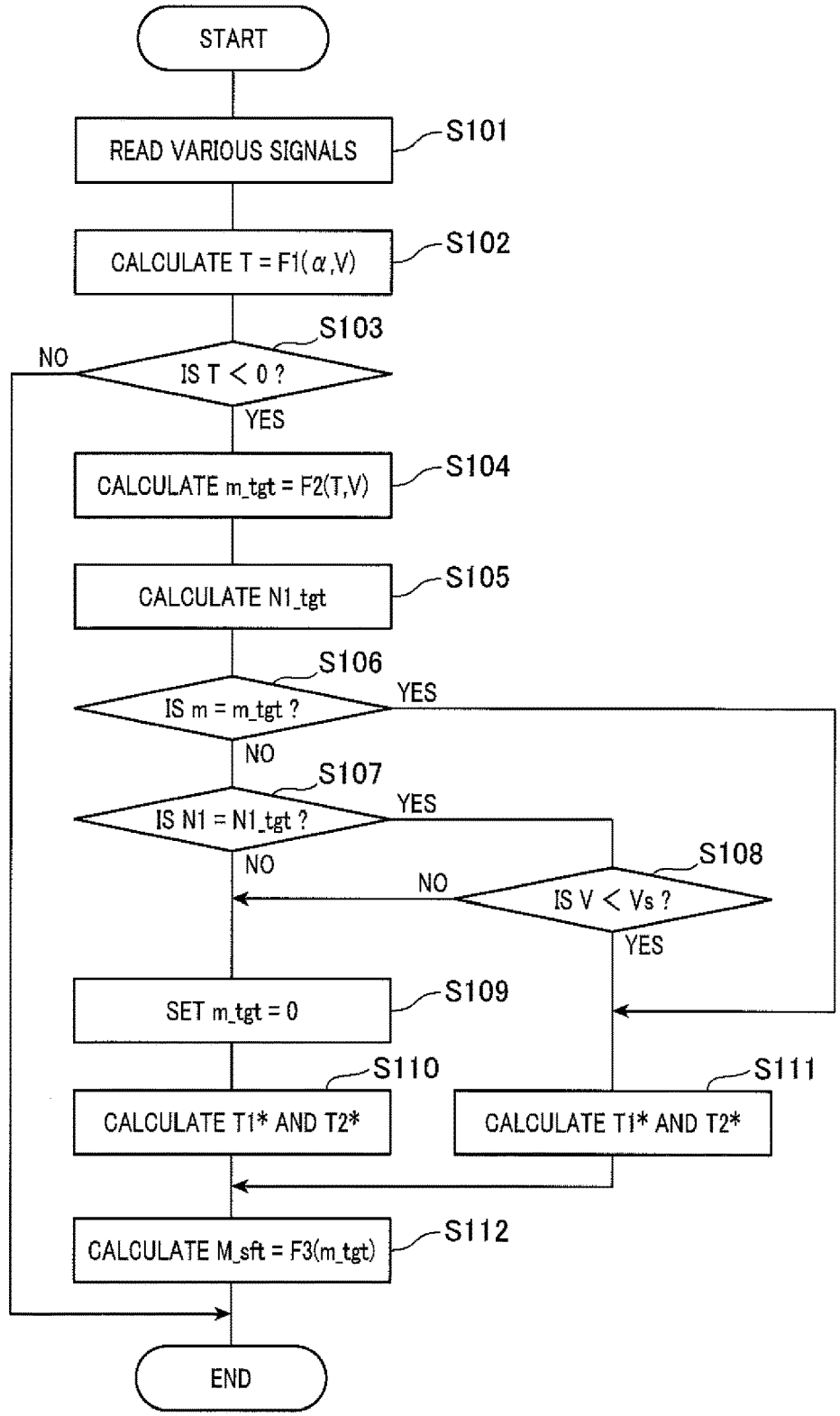
FIG. 2 is a flowchart for explaining a gear shift process according to the first embodiment of the present disclosure.
Figure 6:
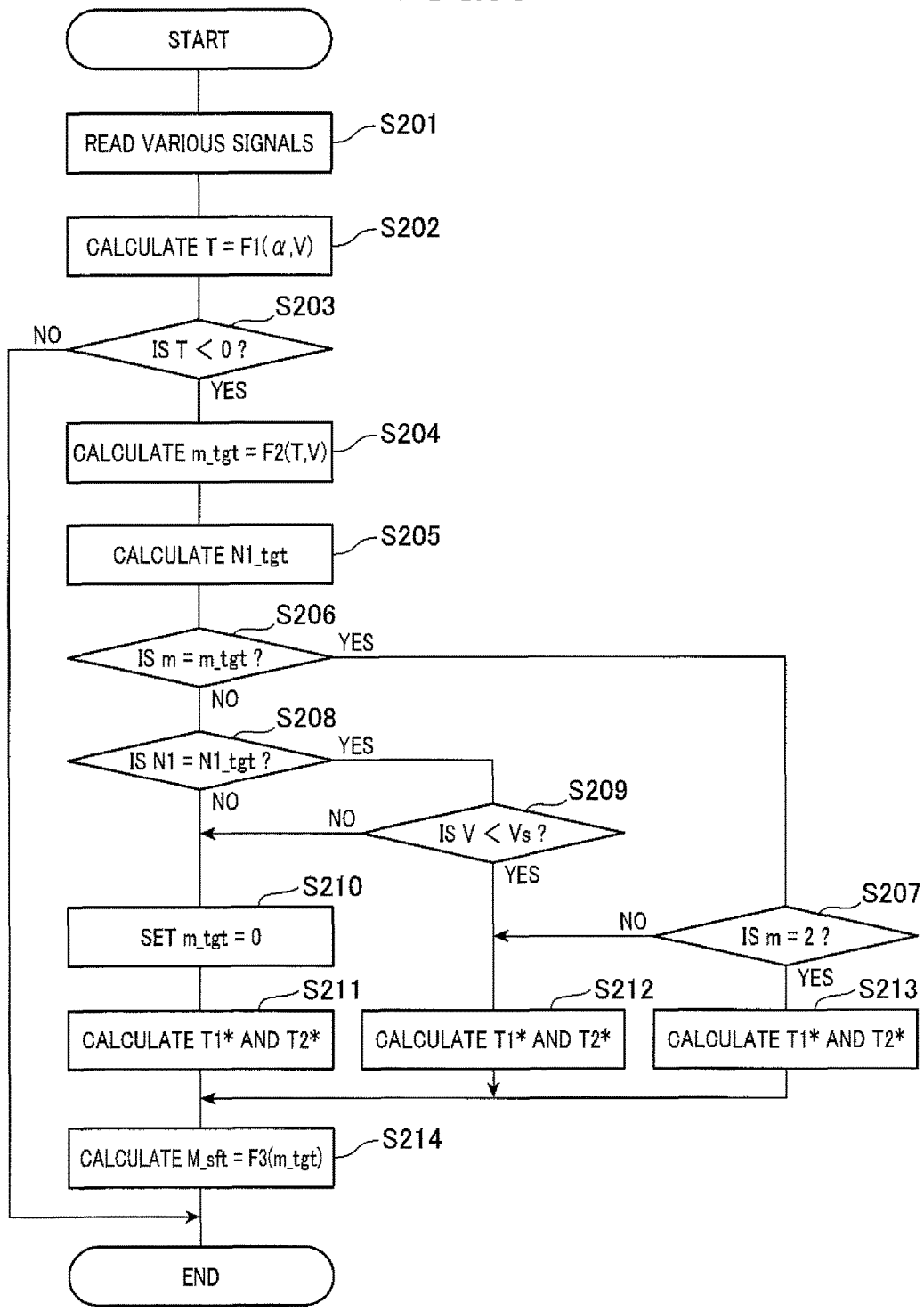
FIG. 6 is a flowchart for explaining a gear shift process according to a second embodiment of the present disclosure.

Processes at S201 to S205 in FIG. 6 are similar to the processes at S101 to S105 in FIG. 2.

In a manner similar to that at S106, at S206, the gear shift control unit 65 determines whether or not the current gear shift stage m is the target gear shift stage m_tgt. When determined that the current gear shift stage m is not the target gear shift stage m_tgt (NO at S206), the drive control apparatus 60 proceeds to S208. When determined that the current gear shift stage m is the target gear shift stage m_tgt (YES at S206), the drive control apparatus 60 proceeds to S207.

At S207, the gear shift control unit 65 determines whether or not the current gear shift stage m is the second gear shift stage. That is, the gear shift control unit 65 determines whether or not m=2. When determined that the current gear shift stage m is not the second gear shift stage (NO at S207), that is, m≠2, the drive control apparatus 60 proceeds to S212. When determined that the current gear shift stage m is the second gear shift stage (YES at S207), the drive control apparatus 60 proceeds to S213.

The processes at S208 to S212 are similar to those at S107 to S111.

When determined the current gear shift stage m is the second gear shift stage (YES at S209), the drive control apparatus 60 proceeds to S213. At S213, the motor control unit 64 calculates the first torque command value T1* and the second torque command value T2*. Here, the first torque command value T1* is a value obtained by calculating the required torque T in terms of the second gear ratio ρ2. The second torque command value T2* is 0 (refer to the following expressions (6) and (7)).

$$T1^* = T/\rho 2 \qquad (6)$$

$$T2^* = 0 \qquad (7)$$

The process at S214 to which the drive control apparatus 60 proceeds after S211, S212, or S213 is similar to that at S112.

According to the present embodiment, when the first number of rotations N1 is the target number of rotations N1_tgt and the vehicle speed V is lower than the gear shift stage shift allowable value Vs (YES at S208 and YES at S209), in a state in which the second motor 12 is taking on the generation of brake torque, the gear shift stage M is shifted from the neutral state to the second gear shift stage (S212, S214). When the gear shift stage m shifts to the second gear shift stage (YES at S207), the first motor 11 generates the brake torque instead of the second motor 12 (S213). As a result, regeneration efficiency can be improved.

The motor that generates the brake torque in cases other than when the gear shift stage m is the neutral state may be the first motor 11 or the second motor 12, taking into consideration gear ratio, motor efficiency, and the like.

After the gear shift mechanism 50 shifts from the neutral state to the second gear shift stage, the motor control unit 64 changes the motor that generates the brake torque from the second motor 12 to the first motor 11. For example, when the second gear ratio ρ1 is greater than 1, regeneration efficiency can be improved as a result of the first motor 11 taking on the generation of brake torque.

Effects similar to those according to the above-described embodiment are also achieved.

Third Embodiment

A third embodiment of the present disclosure will be described with reference to FIG. 7.

The gear shift process according to the present embodiment will be described with reference to the flowchart in FIG. 7. The present process is performed at a predetermined interval when a vehicle power supply, such as an ignition power supply, is turned ON. In other words, the present process is performed not only during travelling in EV mode, but also when the engine 10 is being driven.

At S301, the signal acquiring unit 61 reads various signals. The signal acquiring unit 61 reads an engine number of rotations Ne, in addition to the accelerator position α, the vehicle speed V, the first number of rotations N1, the second number of rotations N2, and the gear shift stage m.

The processes at S302 to S313 are similar to those at S202 to S213 in FIG. 6. In a manner similar to the first embodiment, the processes at S307 and S313 may be omitted. The drive control apparatus 60 may proceed to S312 after determining YES at S306.

The drive control apparatus 60 proceeds to S314 after S311, S312, or S314. At S314, the engine control unit 63 determines whether or not the engine 10 can be stopped. The engine control unit 63 determines whether or not the engine 10 can be stopped based on, for example, a coolant temperature of the engine 10 or battery capacity. When determined that the engine 10 can be stopped (YES at S314), the engine control unit 63 stops the engine 10. The drive control apparatus 60 then proceeds to S317. When the engine 10 is already stopped, the stopped state is maintained. When the engine 10 is stopped, the input shaft clutch 25 is in the released state. However, the input shaft clutch 25 may be in the engaged state. When determined that the engine 10 cannot be stopped (NO at S314), the drive control apparatus 60 proceeds to S315.

At S315, the clutch control unit 66 sets the input shaft clutch 25 to the released state, and prevents transmission of power from the engine 10 to the motor input shaft 23 side.

At S316, the engine control unit 63 calculates an engine torque command value Te*. The motor control unit 64 calculates the engine torque command value Te* by PID calculation or the like, based on the difference between the target number of rotations N1_tgt and the engine number of rotations Ne, such that the target number of rotations N1_tgt and the engine number of rotations Ne match. As a result of the engine number of rotations Ne and the first number of rotations N1 being matched, the input shaft clutch 25 can be promptly engaged as required.

The process at S317 is similar to that at S214.

The power transmission system 1 includes the input shaft clutch 25 that is provided on the input shaft 21. The input shaft clutch 25 connects and disconnects the engine 10 and the first motor 11.

The drive control apparatus 60 further includes the engine control unit 63 and the clutch control unit 66. The engine control unit 63 controls the engine 10. The clutch control unit 66 controls the input shaft clutch 25.

In a case in which the engine 10 cannot be stopped when shifting from the first gear shift stage to the second gear shift stage is performed during vehicle deceleration, the clutch control unit 66 sets the input shaft clutch 25 to the released state. The released state is a state in which the engine 10 and the first motor 11 are disconnected. The engine control unit 63 controls the driving of the engine 10 such that the engine number of rotations Ne becomes the target number of rotations N1_tgt.

As a result of the engine number of rotations Ne being synchronized with the first number of rotations N1, the input shaft clutch 25 can be appropriately engaged.

Effects similar to those according to the above-described embodiments are also achieved.

According to the present embodiment, the engine number of rotations Ne corresponds to an "engine rotation speed".

Fourth Embodiment

A fourth embodiment of the present disclosure is shown in FIG. 8 to FIG. 11.

Figure 8:
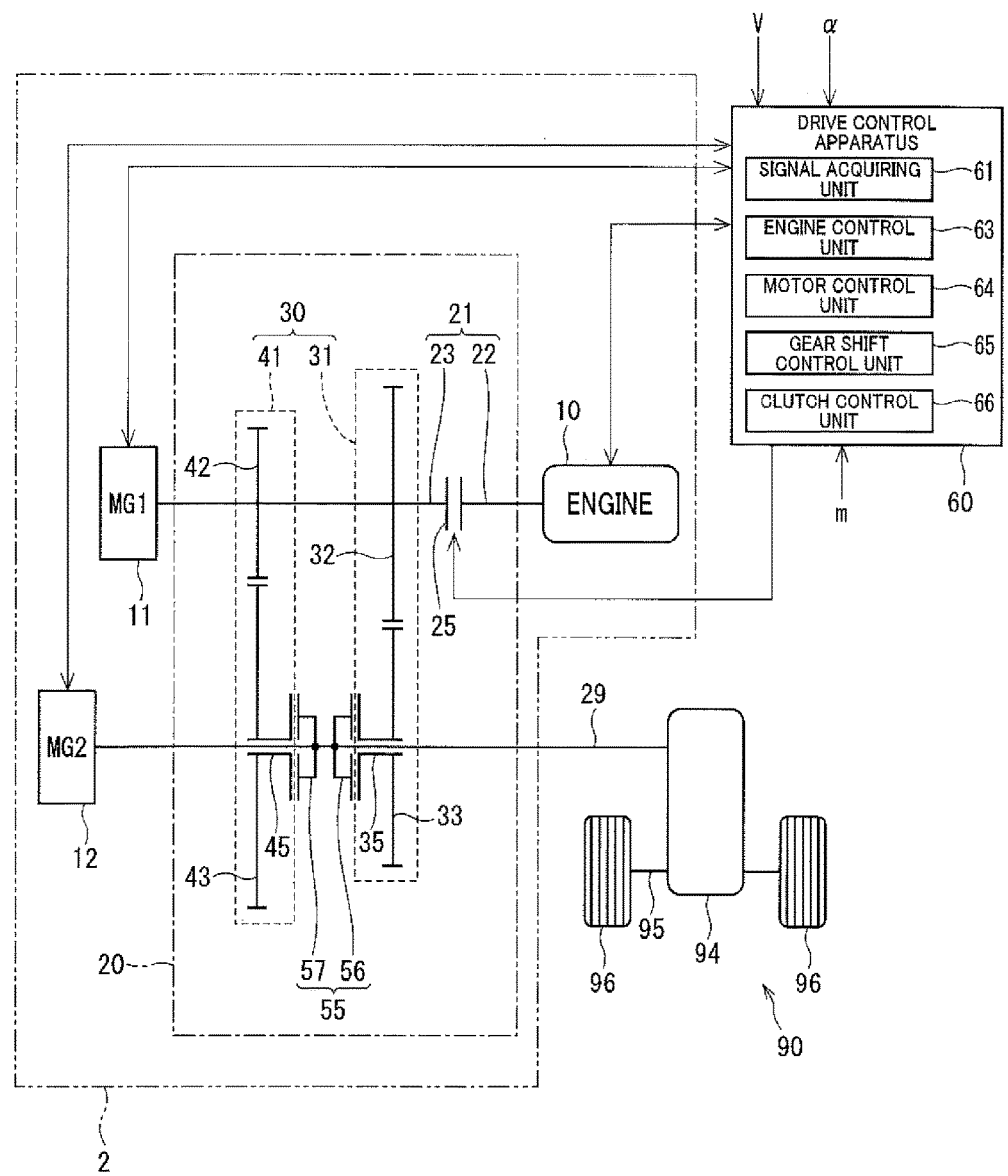
FIG. 8 is an overall configuration diagram of a power transmission system according to a fourth embodiment of the present disclosure.

As shown in FIG. 8, a power transmission system 2 according to the present embodiment differs from the power transmission system 1 according to the above-described embodiments in terms of being provided with a first engaging portion 35 of the first power transmission gear 31, a second engaging portion 45 of the second power transmission gear 41, and a gear shift mechanism 55.

The gear shift mechanism 55 has a first clutch 56 and a second clutch 57. The first clutch 56 and the second clutch 57 are friction clutches. The first clutch 56 and the second clutch 57 may be wet or dry clutches.

The first clutch 56 is provided such as to be capable of engaging with the first engaging portion 35 provided in the first driven gear 33. As a result of the first clutch 56 engaging with the first engaging portion 35, the first driven gear 33 and the output shaft 29 integrally rotate. As a result, power transmission between the input shaft 21 and the output shaft 29 becomes possible via the first power transmission gear 31.

The second clutch 57 is provided such as to be capable of engaging with the second engaging portion 45 provided in the second driven gear 43. As a result of the second clutch 57 engaging with the second engaging portion 45, the second driven gear 43 and the output shaft 29 integrally rotate. As a result, power transmission between the input shaft 21 and the output shaft 29 becomes possible via the second power transmission gear 41.

According to the present embodiment, a state in which the first clutch 56 and the first engaging portion 35 are engaged, and the second clutch 57 and the second engaging portion 45 are not engaged is a "first gear shift stage". The gear shift stage m=1. A state in which the first clutch 56 and the first engaging portion 35 are not engaged, and the second clutch 57 and the second engaging portion 45 are engaged is a "second gear shift stage". The gear shift stage m=2. Furthermore, a state in which the first clutch 56 and the first engaging portion 35 are not engaged, and the second clutch 57 and the second engaging portion 45 are not engaged is a "neutral state". The gear shift stage m=0.

The engagement state between the first clutch 56 and the first engaging portion 35 is a first engagement state me1. The state in which the first clutch 56 and the first engaging portion 35 are engaged is me1=1. The state in which the first clutch 56 and the first engaging portion 35 are not engaged is me1=0. In addition, the engagement state between the second clutch 57 and the second engaging portion 45 is a second engagement state me2. The state in which the second clutch 57 and the second engaging portion 45 are engaged is me2=1. The state in which the second clutch 57 and the second engaging portion 45 are not engaged is me2=0.

The gear shift process according to the present embodiment will be described with reference to the flowcharts in FIG. 9 and FIG. 10. In a manner similar to that according to the third embodiment, the present process is performed at a predetermined interval when a vehicle power supply, such as the ignition power supply, is turned ON. In other words, the present process is performed not only during travelling in EV mode, but also when the engine 10 is being driven.

Figure 9:
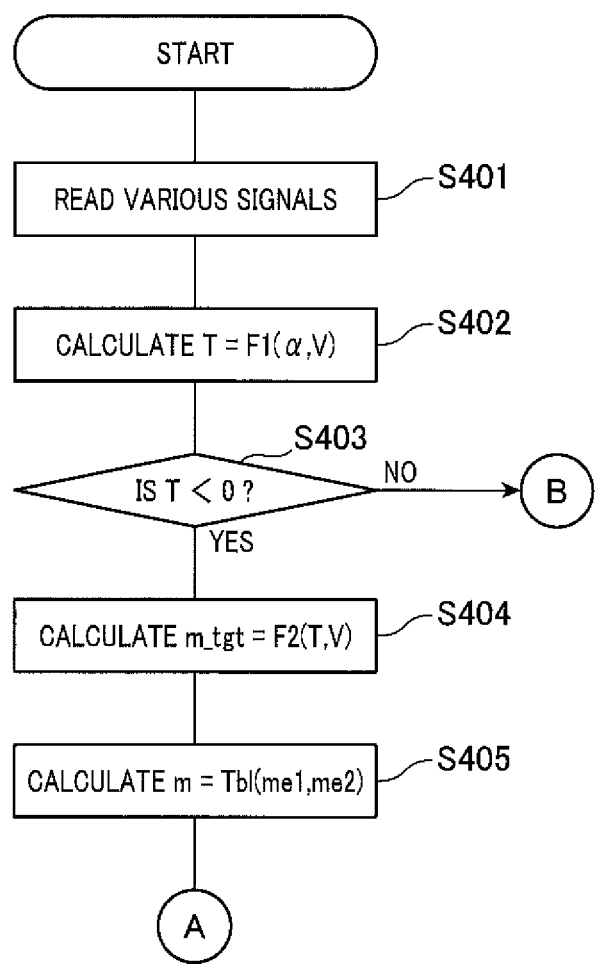
FIG. 9 is a flowchart for explaining a gear shift process according to the fourth embodiment of the present disclosure.

At S401 in FIG. 9, the signal acquiring unit 61 acquires the accelerator position α, the vehicle speed V, the first number of rotations N1, the second number of rotations N2, the first engagement state me1, the second engagement state me2, and the engine number of rotations Ne.

Figure 7:
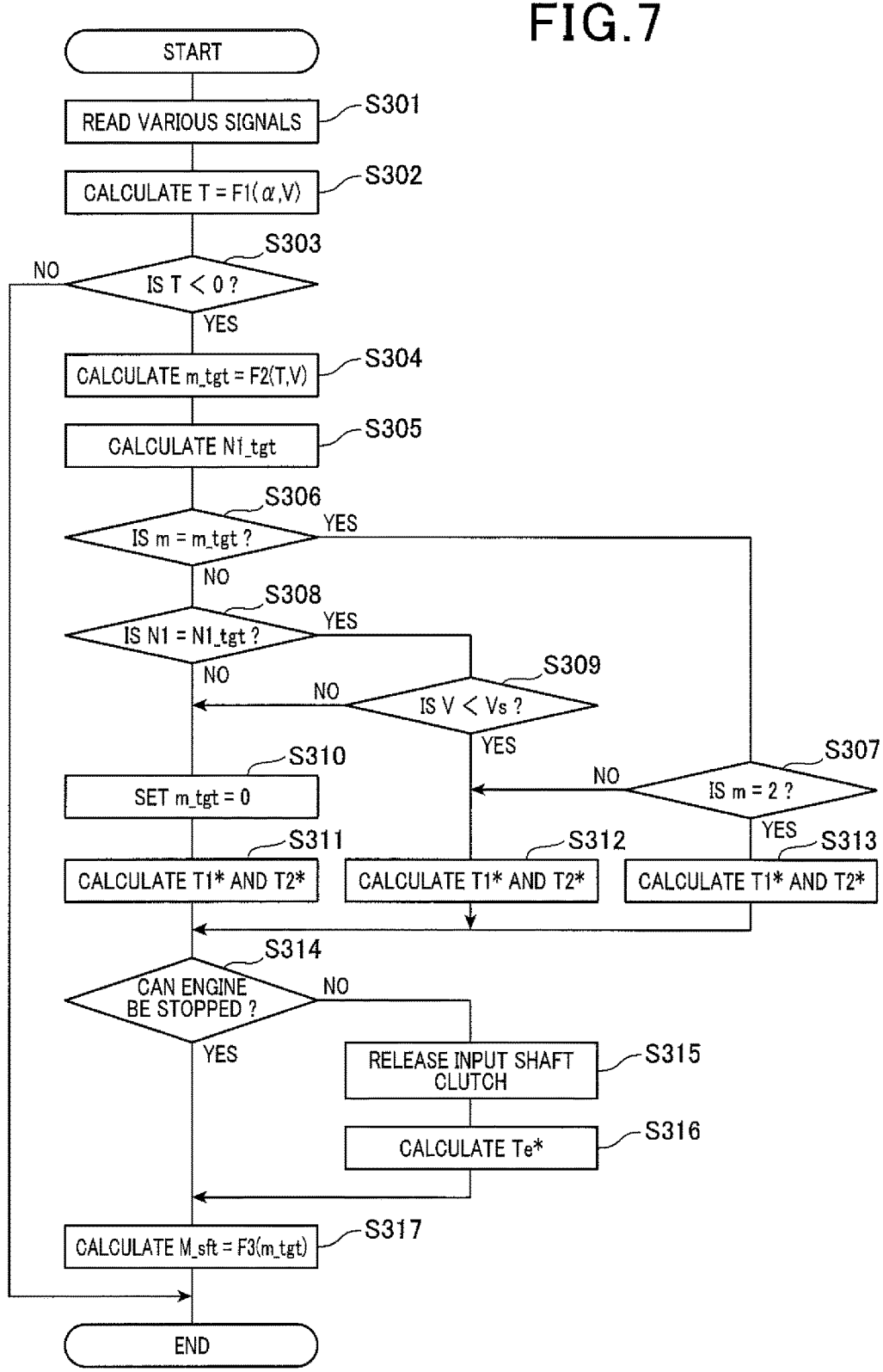
FIG. 7 is a flowchart for explaining a gear shift process according to a third embodiment of the present disclosure.

The processes at S402 to S404 are similar to those at S302 to S304 in FIG. 7. At S405, the gear shift control unit 65 calculates the current gear shift stage m. The gear shift control unit 65 calculates the current gear shift stage m by referencing a table TB1 such as that shown in FIG. 11, based on the first engagement state me1 and the second engagement state me2. That is, when the first engagement state me1=0 and the second engagement state me2=0, the gear shift stage m=0. When the first engagement state me1=1 and the second engagement state me2=0, the gear shift stage m=1. When the first engagement state me1=0 and the second engagement state me2=1, the gear shift stage m=2.

Figure 10:
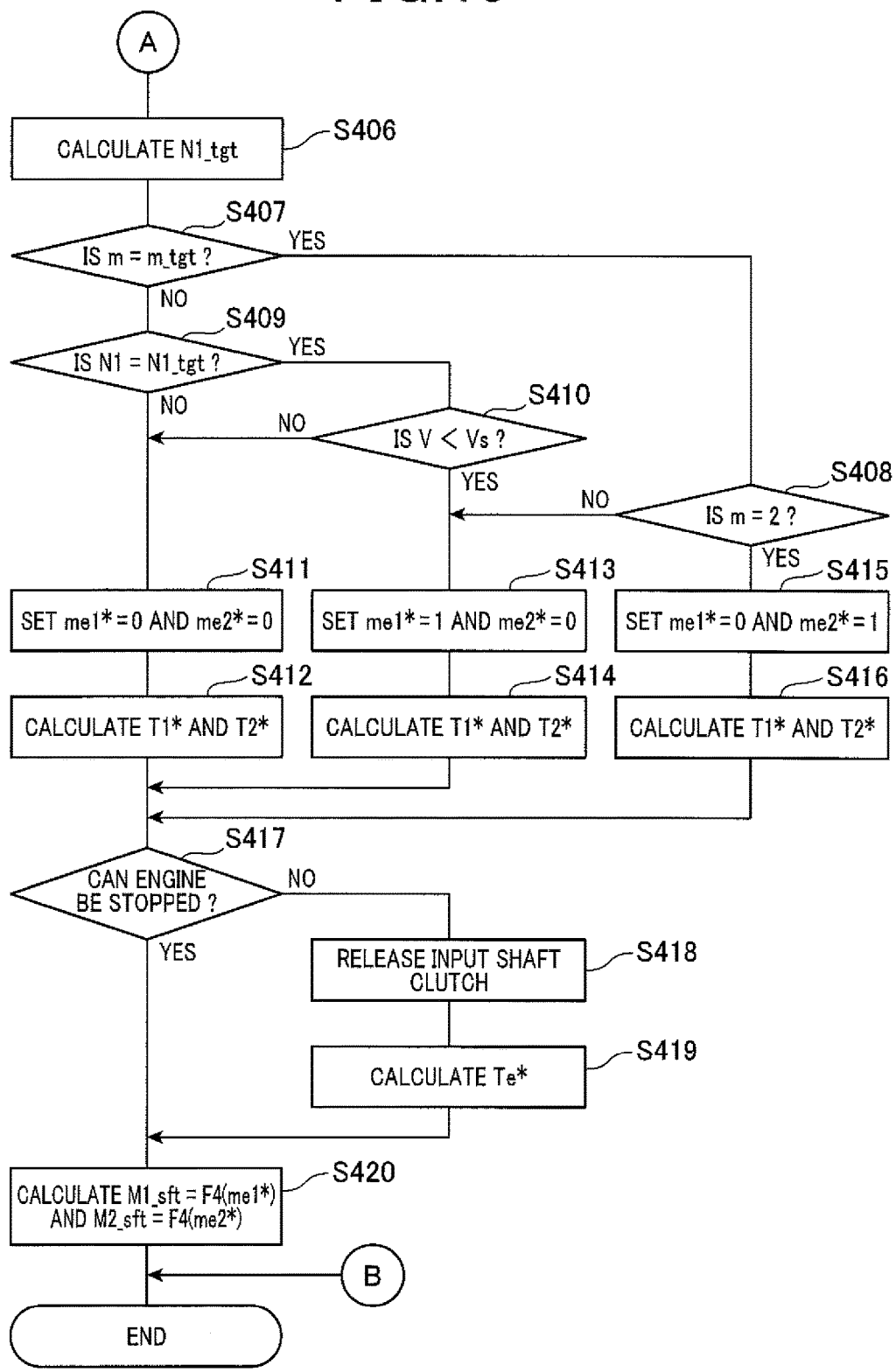
FIG. 10 is a flowchart for explaining a gear shift process according to the fourth embodiment of the present disclosure.

The processes at S406 to S410 in FIG. 10 are similar to those at S305 to S309.

When determined NO at S409 or when determined NO at S410, the drive control apparatus 60 proceeds to S411. At S411, the gear shift control unit 65 sets a first engagement command value me1=0 and a second engagement command value me2*=0 to set the gear shift stage m to the neutral state. Here, me1*=0 is a command for setting the first engagement state me1=0. me1*=1 is a command for setting the first engagement state me1=1. This similarly applies to the second engagement command value me2*.

In a manner similar to that at S110 and the like, at S412, the motor control unit 64 calculates the first torque command value T1* and the second torque command value T2*. That is, the motor control unit 64 calculates the first torque command value T1* by PID calculation or the like, based on the difference between the target number of rotations N1_tgt and the first number of rotations N1, such that the target number of rotations N1_tgt and the first number of rotations N1 match. The second torque command value T2* is set to the required torque T.

When determined NO at S408 or when determined YES at S410, the drive control apparatus 60 proceeds to S413. At S413, the gear shift control unit 65 sets the first engagement command value me1*=1 and the second engagement command value me2*=0 to set the gear shift stage in to the first gear shift stage.

In a manner similar to that at Sill and the like, at S414, the motor control unit 64 calculates the first torque command value T1* and the second torque command value T2* based on the above expressions (4) and (5).

When determined YES at S408, the drive control unit 60 proceeds to S415. At S415, the gear shift control unit 65 sets the first engagement command value me1*=0 and the second engagement command value me2*=1 to set the gear shift stage m to the second gear shift stage.

In a manner similar to that at S213 and the like, at S416, the motor control unit 64 calculates the first torque command value T1* and the second torque command value T2* based on the above expressions (6) and (7).

The processes at S417 to S419 are similar to those at S314 to S316.

Figures 11, 12:
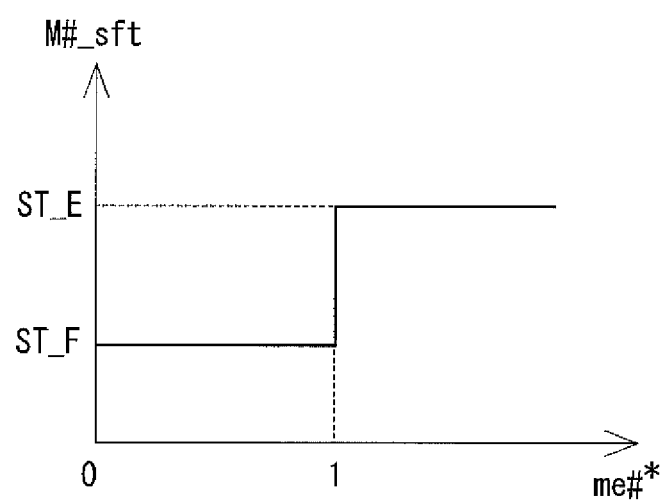
FIG. 11 is a table used to calculate a gear shift stage according to the fourth embodiment of the present disclosure.
FIG. 12 is an explanatory diagram for explaining a map used to calculate a gear shift stage controlled variable according to the fourth embodiment of the present disclosure.

When determined YES at S417 or after S419, the drive control apparatus 60 proceeds to S420. At S420, the gear shift control unit 65 calculates a controlled variable M1_sft of the first clutch 56 and a controlled variable M2_sft of the second clutch 57 as gear shift stage controlled variables, using a map F4 shown in FIG. 12. In FIG. 12, the symbol "#" indicates "1" or "2", meaning that the gear shift control unit 65 calculates the controlled variable M1_sft of the first clutch 56 based on the first engagement command value me1* and the controlled variable M2_sft of the second clutch 57 based on the second engagement command value me2*.

When the first engagement command value me1*=0, the gear shift control unit 65 sets the controlled variable M1_sft to a controlled variable ST_F at which the first clutch 56 is positioned in a release position. When the first engagement command value me1*=1, the gear shift control unit 65 sets the controlled variable M1_sft to a controlled variable ST_E at which the first clutch 56 is positioned in an engaged position.

When the second engagement command value me2*=0, the gear shift control unit 65 sets the controlled variable M2_sft to a controlled variable ST_F at which the second clutch 57 is positioned in a release position. When the second engagement command value me2*=1, the gear shift control unit 65 sets the controlled variable M2_sft to a controlled variable ST_E at which the second clutch 57 is positioned in an engaged position.

According to the present embodiment, when the engine 10 cannot be stopped, the input shaft clutch 25 is set to the release state and the engine number of rotations Ne is controlled to be target number of rotations N1_tgt. However, the processes at S417 to S419 may be omitted under a premise that the vehicle 90 is travelling in EV mode, as according to the first embodiment and the like.

In addition, according to the present embodiment, when the gear shift stage m is shifted to the second gear shift stage, the first motor 11 generates the brake torque. However, the second motor 12 may continue to generate the brake torque even when the gear shift stage m is shifted to the second gear shift stage, as according to the first embodiment. Specifically, the processes at S408 and S416 may be omitted. When determined YES at S407, the drive control apparatus 60 may proceed to S415 and subsequently proceed to S414.

Effects similar to those according to the above-described embodiments are achieved even by a configuration such as this.

Other Embodiments (A) Motor

According to the above-described embodiments, the power transmission system includes two motors. According to another embodiment, the power transmission system may include three or more motors.

(B) Power Transmission Mechanism

According to the above-described embodiments, the power transmission mechanism includes two power transmission gears. According to another embodiment, the power transmission mechanism may be a so-called multi-speed transmission-type that includes three or more power transmission gears and in which the gear to be used for power transmission between the input shaft and the output shaft is changed by a gear shift mechanism.

According to the above-described embodiments, the first power transmission gear that has a small gear ratio is provided on the engine side. The second power transmission gear that has a large gear ratio is provided on the first motor side. According to another embodiment, a plurality of power transmission gears may be arranged in any manner.

According to the fourth embodiment, the gear shift mechanism has a separate first clutch and second clutch. According to another embodiment, the first clutch and the second clutch may be integrated. Furthermore, the gear shift mechanism is not limited to that described according to the above-described embodiments. The gear shift mechanism may be a mechanism for changing the gear used to transmit power between an input shaft and an output shaft, or the like.

The present disclosure is not limited in any way by the above-described embodiments. The present disclosure can be carried out according to various embodiments without departing from the spirit of the invention.

What is claimed is:
1. A drive control apparatus that controls a power transmission system for a vehicle,
the power transmission system comprising:
an input shaft;
an output shaft connected to an axle of the vehicle;
an engine that is connected to a first side of the input shaft;
a first motor that is connected to a second side of the input shaft;
a second motor that is connected to the output shaft;
a power transmission mechanism that has a plurality of power transmission gears, each including an input shaft-side gear provided on the input shaft and an output shaft-side gear provided on the output shaft, the plurality of power transmission gears being configured to transmit power between the input shaft and the output shaft via the input shaft-side gear and the output shaft-side gear; and
a gear shift mechanism that changes the plurality of power transmission gears used to transmit power between the input shaft and the output shaft,
the drive control apparatus comprising:
a motor control unit that controls the first motor and the second motor; and
a gear shift control unit that controls the gear shift mechanism, wherein
the plurality of power transmission gears comprises a first power transmission gear having a first gear ratio and a second power transmission gear having a second gear ratio, the first gear ratio being smaller than the second gear ratio,
the gear shift mechanism includes a first gear shift stage and a second gear shift stage, the first gear shift stage being a state in which power is transmitted between the input shaft and the output shaft by the first power transmission gear, the second gear shift stage being a state in which power is transmitted between the input shaft and the output shaft by the second power transmission gear, and
when the gear shift mechanism is changed from the first gear shift stage to the second gear shift stage during deceleration of the vehicle,
the motor control unit controls the first motor to be at a target rotation speed determined based on the second gear ratio of the second power transmission gear and a rotation speed of the output shaft, and controls the second motor such that required brake torque is generated by the second motor, and
the gear shift control unit controls the gear shift mechanism so as to be in a neutral state in which power is not transmitted between the input shaft and the output shaft, until a rotation speed of the first motor becomes the target rotation speed.

2. The drive control apparatus according to claim 1, wherein:
the gear shift control unit controls the gear shift mechanism so as to change from the neutral state to the second gear shift stage, when the rotation speed of the first motor is the target rotation speed and a travelling speed of the vehicle is lower than a determination threshold.

3. The drive control apparatus according to claim 1, wherein:
the motor control unit changes a motor that generates the brake torque from the second motor to the first motor, after the gear shift mechanism is changed from the neutral state to the second gear shift stage.

4. The drive control apparatus according to claim 2, wherein:
the motor control unit changes a motor that generates the brake torque from the second motor to the first motor, after the gear shift mechanism is changed from the neutral state to the second gear shift stage.

5. The drive control apparatus according to claim 1, wherein:
the power transmission system further comprises:
a connecting-disconnecting unit that is provided on the input shaft, and connects and disconnects the engine and the first motor,
the drive control apparatus further comprises:
an engine control unit that controls the engine; and
a connection-disconnection control unit that controls the connecting-disconnecting unit,
when the engine is not able to be stopped when the gear shift mechanism is changed from the first gear shift stage to the second gear shift stage during deceleration of the vehicle,
the connection-disconnection control unit sets the connecting-disconnecting unit to a release state in which the engine and the first motor are disconnected, and
the engine control unit controls driving of the engine such that a rotation speed of the engine becomes the target rotation speed.

6. The drive control apparatus according to claim 2, wherein:
the power transmission system further comprises:
a connecting-disconnecting unit that is provided on the input shaft, and connects and disconnects the engine and the first motor,
the drive control apparatus further comprises:
an engine control unit that controls the engine; and
a connection-disconnection control unit that controls the connecting-disconnecting unit,
when the engine is not able to be stopped when the gear shift mechanism is changed from the first gear shift stage to the second gear shift stage during deceleration of the vehicle,
the connection-disconnection control unit sets the connecting-disconnecting unit to a release state in which the engine and the first motor are disconnected, and
the engine control unit controls driving of the engine such that a rotation speed of the engine becomes the target rotation speed.

7. The drive control apparatus according to claim 3, wherein:
the power transmission system further comprises:
a connecting-disconnecting unit that is provided on the input shaft, and connects and disconnects the engine and the first motor,
the drive control apparatus further comprises: and
an engine control unit that controls the engine;
a connection-disconnection control unit that controls the connecting-disconnecting unit,
when the engine is not able to be stopped when the gear shift mechanism is changed from the first gear shift stage to the second gear shift stage during deceleration of the vehicle,
the connection-disconnection control unit sets the connecting-disconnecting unit to a release state in which the engine and the first motor are disconnected, and
the engine control unit controls driving of the engine such that a rotation speed of the engine becomes the target rotation speed.

8. The drive control apparatus according to claim 4, wherein:
the power transmission system further comprises:
a connecting-disconnecting unit that is provided on the input shaft, and connects and disconnects the engine and the first motor,
the drive control apparatus further comprises:
an engine control unit that controls the engine; and
a connection-disconnection control unit that controls the connecting-disconnecting unit,
when the engine is not able to be stopped when the gear shift mechanism is changed from the first gear shift stage to the second gear shift stage during deceleration of the vehicle,
the connection-disconnection control unit sets the connecting-disconnecting unit to a release state in which the engine and the first motor are disconnected, and
the engine control unit controls driving of the engine such that a rotation speed of the engine becomes the target rotation speed.

9. A system for a vehicle, the system comprising:
a power transmission system: and
a drive control apparatus that controls the power transmission system,
the power transmission system comprising:
an input shaft;
an output shaft connected to an axle of the vehicle;
an engine that is connected to a first side of the input shaft;
a first motor that is connected to a second side of the input shaft;
a second motor that is connected to the output shaft;
a power transmission mechanism that has a plurality of power transmission gears, each including an input shaft-side gear provided on the input shaft and an output shaft-side gear provided on the output shaft, the plurality of power transmission gears being configured to transmit power between the input shaft and the output shaft via the input shaft-side gear and the output shaft-side gear; and
a gear shift mechanism that changes the plurality of power transmission gears used to transmit power between the input shaft and the output shaft,
the plurality of power transmission gears comprising a first power transmission gear having a first gear ratio and a second power transmission gear having a second gear ratio, the first gear ratio being smaller than the second gear ratio,
the gear shift mechanism including a first gear shift stage and a second gear shift stage, the first gear shift stage being a state in which power is transmitted between the input shaft and the output shaft by the first power transmission gear, the second gear shift stage being a state in which power is transmitted between the input shaft and the output shaft by the second power transmission gear,
the drive control apparatus comprising:

a motor control unit that controls the first motor and the second motor; and a gear shift control unit that controls the gear shift mechanism, wherein when the gear shift mechanism is changed from the first gear shift stage to the second gear shift stage during deceleration of the vehicle, the motor control unit controls the first motor to be at a target rotation speed determined based on the second gear ratio of the second power transmission gear and a rotation speed of the output shaft, and controls the second motor such that required brake torque is generated by the second motor, and the gear shift control unit controls the gear shift mechanism so as to be in a neutral state in which power is not transmitted between the input shaft and the output shaft, until a rotation speed of the first motor becomes the target rotation speed.

10. A drive control method for controlling a power transmission system for a vehicle, the power transmission system comprising:

an input shaft;

an output shaft connected to an axle of the vehicle;

an engine that is connected to a first side of the input shaft;

a first motor that is connected to a second side of the input shaft;

a second motor that is connected to the output shaft;

a power transmission mechanism that has a plurality of power transmission gears, each including an input shaft-side gear provided on the input shaft and an output shaft-side gear provided on the output shaft, the plurality of power transmission gears being configured to transmit power between the input shaft and the output shaft via the input shaft-side gear and the output shaft-side gear; and a gear shift mechanism that changes the plurality of power transmission gears used to transmit power between the input shaft and the output shaft, the plurality of power transmission gears comprising a first power transmission gear having a first gear ratio and a second power transmission gear having a second gear ratio, the first gear ratio being smaller than the second gear ratio, the gear shift mechanism including a first gear shift stage and a second gear shift stage, the first gear shift stage being a state in which power is transmitted between the input shaft and the output shaft by the first power transmission gear, the second gear shift stage being a state in which power is transmitted between the input shaft and the output shaft by the second power transmission gear, the drive control method comprising:

when the gear shift mechanism is changed from the first gear shift stage to the second gear shift stage during deceleration of the vehicle, controlling, by a motor control unit mounted to the vehicle, the first motor to be at a target rotation speed determined based on the second gear ratio of the second power transmission gear and a rotation speed of the output shaft;

controlling, by the motor control unit, the second motor such that required brake torque is generated by the second motor; and controlling, by a gear shift control unit mounted to the vehicle, the gear shift mechanism so as to be in a neutral state in which power is not transmitted between the input shaft and the output shaft, until a rotation speed of the first motor becomes the target rotation speed.

* * * * *